(12) United States Patent
Onaizi et al.

(10) Patent No.: US 12,270,266 B1
(45) Date of Patent: *Apr. 8, 2025

(54) METHOD OF REMOVING HYDROGEN SULFIDE FROM A SUBTERRANEAN GEOLOGICAL FORMATION WITH AN IMIDAZOLATE-BASED NANOMATERIAL IN AN OIL-BASED DRILLING FLUID

(71) Applicant: KING FAHD UNIVERSITY OF PETROLEUM AND MINERALS, Dhahran (SA)

(72) Inventors: Sagheer A. Onaizi, Dhahran (SA); Mustapha Iddrisu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,003

(22) Filed: Apr. 26, 2024

(51) Int. Cl.
*E21B 21/00* (2006.01)
*B01D 53/52* (2006.01)
(Continued)

(52) U.S. Cl.
CPC .............. *E21B 21/00* (2013.01); *B01D 53/52* (2013.01); *B01D 53/78* (2013.01); *B01J 20/186* (2013.01);
(Continued)

(58) Field of Classification Search
CPC . C09K 8/54; C09K 8/16; C09K 8/206; C09K 8/22; C09K 8/532; C09K 8/52;
(Continued)

(56) References Cited

U.S. PATENT DOCUMENTS

| 11,708,517 | B1 | 7/2023 | Onaizi |
| 2020/0190394 | A1* | 6/2020 | Moorhouse ............ C09K 8/536 |

(Continued)

FOREIGN PATENT DOCUMENTS

| CN | 113389533 A | * | 9/2021 |
| CN | 115406937 A | | 11/2022 |

(Continued)

OTHER PUBLICATIONS

Translation of CN-113389533-A (Year: 2021).*
(Continued)

*Primary Examiner* — Angela M DiTrani Leff
(74) *Attorney, Agent, or Firm* — Oblon, McClelland, Maier & Neustadt, L.L.P.

(57) ABSTRACT

A method of removing hydrogen sulfide from a subterranean geological formation includes mixing a cobalt-imidazolate material with an organic liquid containing one or more unsaturated oil to form a drilling fluid suspension with a pH of 10 or more. The cobalt-imidazolate material is a ZIF-67 and is present in an amount of 0.1 to 2.5 percent by weight of the drilling fluid suspension. The method further includes injecting the drilling fluid suspension in the subterranean geological formation and circulating the drilling fluid suspension in the subterranean geological formation and forming an oil-based mud to scavenge hydrogen sulfide from the subterranean geological formation.

20 Claims, 6 Drawing Sheets

(51) Int. Cl.
  *B01D 53/78*  (2006.01)
  *B01J 20/18*  (2006.01)
  *B01J 20/28*  (2006.01)
  *C09K 8/34*  (2006.01)
  *C09K 8/54*  (2006.01)

(52) U.S. Cl.
  CPC ... *B01J 20/28007* (2013.01); *B01J 20/28066* (2013.01); *B01J 20/28071* (2013.01); *B01J 20/28073* (2013.01); *B01J 20/2808* (2013.01); *B01J 20/28083* (2013.01); *C09K 8/34* (2013.01); *C09K 8/54* (2013.01); *B01D 2253/108* (2013.01); *B01D 2253/304* (2013.01); *B01D 2253/306* (2013.01); *B01D 2253/308* (2013.01); *B01D 2253/311* (2013.01); *B01D 2257/304* (2013.01); *C09K 2208/10* (2013.01); *C09K 2208/20* (2013.01)

(58) Field of Classification Search
  CPC ........ C09K 8/03; C09K 8/04; C09K 2208/10; C09K 2208/20; E21B 21/003; E21B 41/02
  See application file for complete search history.

(56) References Cited

U.S. PATENT DOCUMENTS

2024/0018406 A1* 1/2024 Onaizi .................. C09K 8/16
2024/0117238 A1* 4/2024 Tomson ................ C09K 8/035
2024/0198273 A1* 6/2024 Onaizi ............... B01J 20/28066

FOREIGN PATENT DOCUMENTS

CN      116794110 A     9/2023
IN      351907          8/2016

OTHER PUBLICATIONS

Li et al. ; MOF Enhanced Dielectric Barrier Discharge Plasma Decomposition of H2S in the Presence of Low Alkanes ; Plasma Chemistry and Plasma Processing ; Oct. 14, 2023 ; 7 Pages.
Iddrisu et al. ; Waste to a commodity: the utilization of waste cooking oil for the formulation of oil-based drilling mud with H2S scavenging capability bestowed by the incorporation of ZIF-67 ; Emergent Materials ; Jul. 14, 2023 ; Abstract Only ; 11 Pages.

* cited by examiner

METHOD OF REMOVING HYDROGEN SULFIDE FROM A SUBTERRANEAN GEOLOGICAL FORMATION WITH AN IMIDAZOLATE-BASED NANOMATERIAL IN AN OIL-BASED DRILLING FLUID

STATEMENT REGARDING PRIOR DISCLOSURE BY THE INVENTORS

Aspects of the present disclosure are described in Onaizi, S. A., et al., "Waste to a commodity: the utilization of waste cooking oil for the formulation of oil-based drilling mud with $H_2S$ scavenging capability bestowed by the incorporation of ZIF-67" published in Emergent Materials, which is incorporated herein by reference in its entirety.

Statement of Acknowledgement

Support provided by the Deanship of Research Oversight and Coordination (DROC), King Fahd University of Petroleum and Minerals, Saudi Arabia through project number DF191027 is gratefully acknowledged.

BACKGROUND

Technical Field

The present disclosure is directed to a method of hydrogen sulfide ($H_2S$) scavenging in a subterranean geological formation, and more particularly, directed to a method of removing $H_2S$ from a subterranean geological formation using a zeolitic imidazole framework (ZIF) material.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Exposure to hydrogen sulfide ($H_2S$) during drilling operations is a health and safety concern. $H_2S$ is a toxic, lethal, and corrosive gas. This sour gas is formed from the biological decomposition of sulfate minerals and biomass by sulfate-reducing bacteria (SRB) and the high-temperature breakdown of sulfur compounds catalyzed by anhydrite present in subterranean formations. This gas is flammable and becomes explosive when it forms a gaseous mixture with air within the concentrations of 4 to 45 percent by weight of the gaseous mixture and has an autoignition temperature of 232 degrees Celsius (° C.). $H_2S$ is very corrosive to metals and reacts with steel structures to produce free hydrogen ions and ferrous sulfide (FeS). This results in hydrogen embrittlement, sulfide cracking, and pitting corrosion, which collectively result in the failure of the metallic structures and diminish the drilling equipment's lifetime.

The prolonged exposure of working personnel to $H_2S$, even at low concentrations, can potentially result in severe injuries, chronic health complications, and, in some cases, death. The Occupational Safety and Health Administration (OSHA) recommends a maximum exposure limit of 50 parts per million (ppm) for $H_2S$ in a 10-minute period [Y. Li, K. Zhou, M. He, J. Yao, Synthesis of ZIF-8 and ZIF-67 using mixed-base and their dye adsorption. *Microporous Mesoporous Mater.* 234, 287-292 (2016)]. The exposure to higher concentrations (i.e., >50 ppm) is life-threatening. Moreover, the rheological properties of fluid exposed to $H_2S$ are negatively impacted and leads to poorer performance of the fluid. The viscosity and density of the fluid are altered when exposed to $H_2S$. Exposure to $H_2S$ also increases the acidity of the fluids, making them more corrosive. The operational safety issues and economic losses associated with $H_2S$ exposure during drilling in the oil and gas industry look to robust measures to mitigate the consequences of the release of this lethal sour gas on both drilling infrastructure and working personnel.

A wide variety of materials have been utilized as additives to improve the $H_2S$ scavenging capacities of drilling fluid suspensions. Additives such as transition metals, amines, aldehydes, oxidants, triazines, acrolein, and nitrates, among others, have been utilized as $H_2S$ scavengers. $H_2S$ is removed by either a chemical reaction or a surface absorption mechanism. The incorporation of some $H_2S$ scavengers improves the drilling fluid performance. In drilling operations, drilling fluid suspensions play very crucial functions. They are utilized to provide hydrostatic pressure, minimize corrosion, maintain the stability of the oil well, lubricate the drill bit, transport cuttings, and prevent formation damages.

Zeolitic imidazolate frameworks (ZIFs), a class of metal-organic framework (IOF), have recently gained wide attention and applications in numerous fields due to their tunability, chemical stability, thermal stability, high surface area, structural flexibility, and open porous framework. ZIFs have a sodalite-type (SOD-type) topology like that of silica-based zeolites. ZIFs are metal imidazolate compounds constructed through the coordination of $Zn^{2+}/Co^{2+}$ metal clusters (M) and an imidazole ligand (Im) forming a 3D framework. The M-Im-M structure of ZTFs is like the Si—O—Si structure present in silicon-based zeolites. ZIFs offer both the advantages of MOFs and zeolites since they possess the properties of these two materials, such as crystallinity, porosity, and thermal and chemical stability. ZIFs have gained application in wide areas such as catalysis, gas sensing, and adsorption, among others.

Over 150 ZIF structures have been synthesized. ZIFs are used in numerous applications due to their low cost, ease of preparation, high yield, robustness, strong hydrophobicity, super-oleophilicity, and thermal and chemical stability.

Although several ZIFs have been synthesized in the past, their applicability in use as $H_2S$ scavengers for drilling operations has been thus far limited. Accordingly, an object of the present disclosure is to develop a method of removing hydrogen sulfide ($H_2S$) from subterranean geological formations with a ZIF-based additive for an organic fluid drilling fluid suspension, which, when used in defined concentrations, imparts the drilling fluid suspensions with improved rheological properties that may circumvent the drawbacks of traditional methods.

SUMMARY

In an exemplary embodiment, a method of removing hydrogen sulfide ($H_2S$) from a subterranean geological formation is described. The method includes mixing a cobalt-imidazolate material with an organic liquid to form a drilling fluid suspension. The cobalt-imidazolate material is present in an amount of 0.1 to 2.5 percent by weight (wt. %) of the drilling fluid suspension based on the total weight of the drilling fluid suspension. The cobalt-imidazolate material is a ZIF-67. The organic liquid includes one or more unsaturated oils. The drilling fluid suspension has a pH of 10 or more. The method further includes injecting the drilling fluid suspension in the subterranean geological formation, circulating the drilling fluid suspension in the subterranean geological formation, and forming an oil-based mud. Furthermore, the method includes scavenging hydrogen sulfide from the subterranean geological formation. The hydrogen sulfide reacts with the cobalt-imidazolate material during the scavenging.

In some embodiments, the cobalt-imidazolate material has a Brunauer-Emmett-Teller surface area of 1100 to 1200 meters square per gram ($m^2/g$).

In some embodiments, the cobalt-imidazolate material is porous and has a specific pore volume of 0.400 to 0.600 cubic meters per gram ($cm^3/g$). In some embodiments, the cobalt-imidazolate material is porous and has an average pore size of 1 to 3 nanometers (nm). In some embodiments, the cobalt-imidazolate material is in the form of nanoparticles and has an average particle size of 15 to 25 nm.

In some embodiments, the organic liquid comprises at least one or more unsaturated oils, a polysorbate, a gum Arabic, a copolymer, water, a sodium sulfonate, a starch, a bentonite, a hydroxide, a chloride salt, a carbonate salt, and a barite.

In some embodiments, the organic liquid comprises an unsaturated oil and a volumetric ratio of the unsaturated oil to the water is from 70:30 to 90:10 in the organic liquid.

In some embodiments, the polysorbate is polysorbate 80.

In some embodiments, the one or more unsaturated oils includes at least one triglyceride, a glycerol, at least one triacylglycerol, at least one diacylglycerol, at least one monoacylglycerol, a linoleic acid, a stearic acid, an oleic acid, and a palmitic acid.

In some embodiments, the drilling fluid suspension consists of the cobalt-imidazolate material, the unsaturated oil, a glycerol, a triacylglycerol, a diacylglycerol, a monoacylglycerol, linoleic acid, stearic acid, oleic acid, and palmitic acid scavenges 1100 to 1300 milligrams of hydrogen sulfide per one liter of the oil-based mud.

In some embodiments, a breakthrough time for the hydrogen sulfide in the presence of the drilling fluid suspension is 2 to 3 times greater compared to a breakthrough time for the hydrogen sulfide in the presence of the drilling fluid suspension without the cobalt-imidazolate material.

In some embodiments, a saturation time for the hydrogen sulfide in the presence of the drilling fluid suspension is 2 to 4 times greater compared to a saturation time for the hydrogen sulfide in the presence of the drilling fluid suspension without the cobalt-imidazolate material.

In some embodiments, a breakthrough capacity for the hydrogen sulfide in the presence of the drilling fluid suspension is 2 to 3 times greater compared to a breakthrough capacity for the hydrogen sulfide in the presence of the drilling fluid suspension without the cobalt-imidazolate material.

In some embodiments, a saturation capacity for the hydrogen sulfide in the presence of the drilling fluid suspension is 1 to 3 times greater compared to a saturation capacity for the hydrogen sulfide in the presence of the drilling fluid suspension without the cobalt-imidazolate material.

In some embodiments, a plastic viscosity of the drilling fluid suspension is about 10 to 40% lower compared to a plastic viscosity of the drilling fluid suspension without the cobalt-imidazolate material.

In some embodiments, an apparent viscosity of the drilling fluid suspension is about 20 to 50% lower compared to an apparent viscosity of the drilling fluid suspension without the cobalt-imidazolate material.

In some embodiments, the hydrogen sulfide is scavenged through uncoordinated open metal cobalt (11) and surface nitrogen functional groups in the cobalt-imidazolate material.

In some embodiments, the method further includes flowing hydrogen sulfide gas into the drilling fluid suspension.

In some embodiments, the hydrogen sulfide is at a concentration of 50 to 150 parts per million volume (ppmv) with a balance to methane in the subterranean geological formation.

In some embodiments, the method includes flowing of hydrogen sulfide gas at a rate of 50 to 150 milliliters per minute (mL/min).

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof may be readily obtained as the same becomes better understood by reference to the following detailed description when considered in connection with the accompanying drawings, wherein.

DETAILED DESCRIPTION

Figure 1:
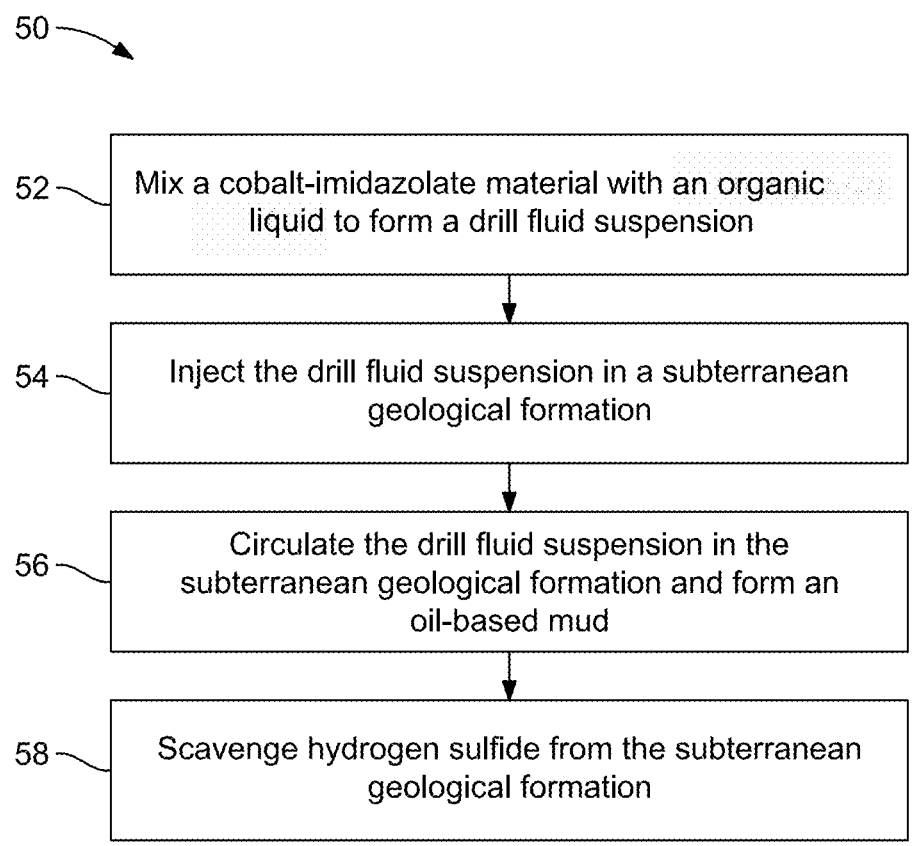
FIG. 1 is a flow chart of a method for removing hydrogen sulfide ($H_2S$) from a subterranean geological formation, according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or similar reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, the term "zeolitic material," "zeolitic framework," or "zeolitic imidazole framework" refers to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also includes channels, channel intersections, and/or cages having dimensions in the range of 0.1-10 nanometers (nm), preferably 0.2-5 nm, and more preferably 0.2-2 nm. Water molecules may be present inside these channels, channel intersections, and/or cages. Zeolites that are devoid of aluminum may be referred to as "all-silica zeolites" or "aluminum-free zeolites." Some zeolites that are substantially free of, but not devoid of, aluminum are referred to as "high-silica zeolites." Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g., gonnardite, natrolite, mesolite, paranatrolite, scolecite, and tetranatrolite), edingtonite framework (e.g., edingtonite and kalborsite), thomsonite framework, analcime framework (e.g., analcime, leucite, pollucite, and wairakite), phillipsite framework (e.g., harmotome), gismondine framework (e.g., amnicite, gismondine, garronite, and gobbinsite), chabazite framework (e.g., chabazite-series, herschelite, willhendersonite, and SSZ-13), faujasite framework (e.g., faujasite-series, Linde type X, and Linde type Y), mordenite framework (e.g., maricopaite and mordenite), heulandite framework (e.g., clinoptilolite and heulandite-series), stilbite framework (e.g., barrerite, stellerite, and stilbite-series), brewsterite framework, cowlesite framework, and the like.

Aspects of the present disclosure are directed to a method for removing hydrogen sulfide ($H_2S$) from a subterranean geological formation using a zeolitic imidazolate framework-67 (ZIF-67). The $H_2S$ scavenging performance of ZIF-67 nanoparticles (NPs) and its effect on the rheological and fluid loss properties of oil-based drilling mud is studied and the results indicate that the incorporation of the ZIF-67 NPs into the drilling fluid suspensions has been found to enhance the $H_2S$ scavenging performance, improve the plastic viscosity (PV), and apparent viscosity (AV) of the base mud.

FIG. 1 illustrates a flow chart of a method 50 for removing hydrogen sulfide from a subterranean geological formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure. The subterranean geological formation may include, but is not limited to, a depleted oil reservoir, a depleted gas reservoir, a sour reservoir, a hydrocarbon-bearing subterranean formation, a saline formation, an un-minable coal bed, and the like. In some embodiments, the method 50 may remove hydrogen sulfide from mixed production streams, water injection systems, produced water from an oil field, and the like.

At step 52, the method 50 includes mixing a cobalt-imidazolate material with an organic liquid to form a drilling fluid suspension. In some embodiments, the cobalt-imidazolate material is a zeolitic imidazole framework (ZIF-67). ZIF-67 is composed of a tetrahedrally coordinated divalent cobalt metal ion and an imidazolate ligand. The ZIF-67 has a highly stable structure due to its cubic crystal symmetry and unit cell characteristics of a=b=c=16.9589 Å. In some embodiments, the ZIF-67 may be substituted by and/or used in combination with ZIF-1, ZIF-2, ZIF-3, ZIF-4, ZIF-5, ZIF-6, ZIF-7, ZIF-8, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, ZIF-725, the like, and a combination thereof.

The imidazolate forms the organic ligand in the cobalt-imidazolate material. Imidazolate is the conjugate base of imidazole. Exemplary imidazole-based organic ligands include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl)methanol, 4-(hydroxymethyl)imidazole, 2-aminoimidazole, 4-(trifluoromethyl)-1H-imidazole, 4-cyanoimidazole, 3H-imidazole carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl)imidazole, 4,5-dicyanoimidazole, 4-imidazoleacetic acid, 4-methyl-5-imidazolemethanol, 1-(4-methyl-1H-imidazol-5-yl)methanamine, 4-imidazoleacrylic acid, 5-bromo-2-propyl-1H-imidazole, ethyl-(1H-imidazol-2-ylmethyl)-amine, 2-butyl-5-hydroxymethylimidazole, and the like.

The cobalt-imidazolate material is present in the drilling fluid suspension in an amount of 0.1 to 2.5 percent by weight (wt. %), more preferably 0.3 to 2.0 wt. %, more preferably 0.5 to 1.5 wt. %, and yet more preferably about 1.0 wt. % of the total weight of the drilling fluid suspension prior to injection into the subterranean geological formation. In some embodiments, the cobalt-imidazolate material has a Brunauer-Emmett-Teller surface area of 1100 to 1200 square meters per gram ($m^2/g$), more preferably 1150 to 1160 $m^2/g$, and yet more preferably about 1158 $m^2/g$. In some embodiments, the cobalt-imidazolate material is porous and has an average pore size of 1 to 3 nm, more preferably 1.5 to 2.5 nm, and yet more preferably about 1.71 nm. In some embodiments, the cobalt-imidazolate material is porous and has a specific pore volume of 0.4 to 0.6 cubic centimeters per gram ($cm^3/g$), more preferably 0.45 to 0.5 $cm^3/g$, and yet more preferably about 0.495 $cm^3/g$. In some embodiments, the cobalt-imidazolate material is in the form of nanoparticles and has an average particle size of 15 to 25 nm, more preferably 18 to 22 nm, and yet more preferably about 20.7 nm. In some embodiments, the nanoparticles may exist in various morphological shapes, such as nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, the like, and mixtures thereof.

In some embodiments, the cobalt-imidazolate material may also include copper compounds such as copper oxide, copper sulfate, copper molybdate, copper hydroxide, copper halide, copper carbonate, copper hydroxy carbonate, copper carboxylate, copper phosphate, copper hydrates, and copper derivatives thereof; calcium salts, cobalt salts, nickel salts, lead salts, tin salts, zinc salts, iron salts, manganese salts, zinc oxide, iron oxides, manganese oxides, triazine, monoethanolanine, diethanolamine, caustic soda, the like and combinations thereof.

In some embodiments, the cobalt-imidazolate material may be presented as a composite material with any other scavenger material, such as a metal-organic framework and the like, and/or support material including, but not limited to, non-metallic supports and/or metallic supports, such as graphene oxide, carbon nanotubes, activated carbon, layered double hydroxide, layered triple hydroxide, metal oxide, zeolites, the like, and combinations thereof. The cobalt-imidazolate material may be synthesized by any method including, but not limited to, hydrothermal method, solvothermal method, or sol-gel method, and any morphology enhancing agent including any alkali or amine solution, but not limited to, $NH_4OH$ may be utilized.

In some embodiments, the organic liquid includes one or more unsaturated oils, preferably the liquid portion of the organic liquid consists of, or consists essentially of, the one or more unsaturated oils. The unsaturated oils may include one or more selected from triglycerides, glycerol, triacylglycerols, diacylglycerols, monoacylglycerols, a linoleic acid, a stearic acid, an oleic acid, and a palmitic acid. Suitable examples of unsaturated oils may include sunflower oil, safflower oil, rapeseed oil, olive oil, peanut oil, walnut oil, corn oil, vegetable oil, the like, and a combination thereof. The unsaturated oils form the majority liquid ingredient in the drilling fluid suspension accounting for at least 50 percent by volume, preferably at least 60 percent by volume, more preferably 70 percent by volume, and yet more preferably at least 80 percent by volume of the drilling fluid suspension. The type of oil used in the organic liquid affects the $H_2S$ performance of the drilling fluid suspension. Certain oils such as mineral oil and conventional diesel oils used in drilling fluid suspension have a substantial aromatic component. The unsaturated oils of the drilling fluid suspension are preferably free of aromatic components. In some embodiments, the one or more unsaturated oils are waste cooking oils. Waste cooking oils may refer to cooking oils that have been spent, cooked with, and/or otherwise used in cooking. Waste cooking oils (WCO), like sunflower oil, safflower oil, rapeseed oil, olive oil, peanut oil, walnut oil, corn oil, vegetable oil, and the like, are a suitable alternative to toxic mineral oils. Waste cooking oils are eco-friendly, non-toxic, biodegradable, readily available, cheap, and do not create food competition when utilized in the drilling fluid suspension. The unsaturated oils act as a base fluid.

In some embodiments, the organic liquid includes a polysorbate. In some embodiments, the polysorbate may be a polysorbate 20, a polysorbate 40, a polysorbate 60, a polysorbate 80, the like, and a combination thereof. In a preferred embodiment, the polysorbate is polysorbate 80 or span 80. The polysorbate acts is a primary emulsifier. The volumetric ratio of the one or more unsaturated oils to the water is from 70:30 to 90:10, preferably 75:25 to 85:15, and more preferably 80:20, in the organic liquid. In some embodiments, the organic liquid includes a gelling agent, such as gum Arabic. Certain other examples of gelling agents include a carbomer, a carrageenan, a chitosan, a gelatin, a pectin, a poloxamer, a poly(ethylene), a copolymer, such as poly(vinyl butyral-co-vinyl alcohol-co-vinyl acetate), and the like. The gelling agent may be used to impart viscosity and/or stabilize the drilling fluid suspension.

In some embodiments, the organic liquid includes water such as tap water, distilled water, bi-distilled water, deionized water, deionized distilled water, reverse osmosis water, hard water, fresh water, brine/salt water, the like, and a combination thereof. In a preferred embodiment, the water is distilled water. The brine/salt water, the hard water, and the fresh water may include salts of sodium, magnesium, calcium, potassium, ammonium, iron, and the like, and anions such as chloride, bicarbonate, carbonate, sulfate, sulfite, phosphate, iodide, nitrate, acetate, citrate, fluoride, nitrite, and the like. The water may be used as a dispersed phase to reduce cohesive forces between particles of the same type and enhanced dispersion of the ZIF-67.

In some embodiments, the organic liquid further includes an emulsifier. In a preferred embodiment, the emulsifier is a sodium sulfonate such as sodium dodecane-1-sulfonate, sodium decane-1-sulfonate, sodium octadecane-1-sulfonate, 1-octanesulfonic acid, sodium dodecylbenzene sulfonate, the like, and a combination thereof as a secondary emulsifier. The emulsifiers are utilized to enhance the dispersion of the scavenger. In some embodiments, the organic liquid further includes an alkali metal halide salt. In some embodiments, the alkali metal halide salt is a chloride salt, such as sodium chloride, potassium chloride, lithium chloride, rubidium chloride, cesium chloride, the like, and a combination thereof. In a preferred embodiment, the alkali metal halide salt is potassium chloride. The alkali metal halide salt may be used as a shale stabilizer.

In some embodiments, the organic liquid further includes starch. The starch acts as a fluid loss prevention agent. The fluid loss prevention agent is an additive of the drilling fluid suspension that controls loss of the drilling fluid suspension when injected into the subterranean geological formation. In some embodiments, the drilling fluid suspension may include multiple fluid loss prevention agents depending on the customized need of a user. In some embodiments, the other fluid loss prevention agents such as, polysaccharides, silica flour, gas bubbles (energized fluid or foam), benzoic acid, soaps, resin particulates, relative permeability modifiers, degradable gel particulates, hydrocarbons dispersed in fluid, one or more immiscible fluids, the like, and a combination thereof may be used as well. In some embodiments, the starch is a corn starch.

In some embodiments, the organic liquid further includes a bentonite. The bentonite may refer to potassium bentonite, sodium bentonite, calcium bentonite, aluminum bentonite, and combinations thereof, depending on the relative amounts of potassium, sodium, calcium, and aluminum in the bentonite. The bentonite acts as a viscosifier. The viscosifier is an additive of the drilling fluid suspension that increases the viscosity of the drilling fluid suspension. In some embodiments, the bentonite may be substituted by and/or used in combination with other viscosifiers that may include, but are not limited to, sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, and the like. In some embodiments, the viscosifier may further include a natural polymer, such as a hydroxyethyl cellulose (HEC) polymer, a carboxymethylcellulose polymer, a polyanionic cellulose (PAC) polymer, and the like, or a synthetic polymer, such as poly(diallyl amine), diallyl ketone, diallyl amine, styryl sulfonate, vinyl lactam, laponite, polygorskites (such as attapulgite, sepiolite, and the like), a drilling polymer, a resonated polymer, a polyacrylate polymer, the like, and combinations thereof. A viscosifier may be used to increase a carrying capacity of the drilling fluid suspension.

In some embodiments, the organic liquid further includes a hydroxide. The hydroxide acts as a pH-adjusting agent, also referred to as the buffer. The pH-adjusting agent may include an alkali metal base. In some embodiments, the alkali metal base may include, but is not limited to, potassium hydroxide, lithium hydroxide, rubidium hydroxide cesium hydroxide, and sodium hydroxide. In a preferred embodiment, the pH-adjusting agent is caustic soda (sodium hydroxide). In some embodiments, the pH-adjusting agent may include, but is not limited to, monosodium phosphate, disodium phosphate, sodium tripolyphosphate, and the like. In some embodiments, the pH of the drilling fluid suspension is acidic or neutral. In a preferred embodiment, the pH of the drilling fluid suspension is basic, with pH ranging from 7 to 14, preferably 8 to 13, more preferably 10 to 14, and yet more preferably 11 to 13. In some embodiments, the organic liquid further includes a carbonate, such as sodium carbonate, as a pH treatment source.

In some embodiments, the organic liquid further includes a barite as a weighting agent. The weighting agent is an agent that increases the overall density of the drilling fluid suspension to provide a sufficient bottom-hole pressure to prevent an unwanted influx of formation fluids. The density of the organic liquid includes all practical ranges and is not limited to 9 pounds-per-gallon (ppg). In some embodiments, the weighting agent may include but is not limited to, calcium carbonate, sodium sulfate, hematite, siderite, ilmenite, the like, and a combination thereof.

In some embodiments, the drilling fluid suspension may also include a deflocculant. Deflocculant is an additive of the drilling fluid suspension that prevents a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho, the like, and a combination thereof.

In some embodiments, the drilling fluid suspension may also include a lubricant. In some embodiments, LUBE 1017OB may be used as the lubricant. In some embodiments, the lubricant may include, but is not limited to, polyalpha-olefin (PAO), synthetic esters, polyalkylene glycols (PAG), phosphate esters, alkylated naphthalenes (AN), silicate esters, ionic fluids, multiply alkylated cyclopentanes (MAC), the like, and a combination thereof.

In some embodiments, the drilling fluid suspension may also include a crosslinker. The crosslinker is an additive of the drilling fluid suspension that can react with multiple-strand polymers to couple molecules together, thereby creating a highly viscous fluid, with a controllable viscosity. The crosslinker may include but is not limited to, metallic salts, such as salts of aluminium, iron, boron, titanium, chromium, zirconium, and the like, and/or organic crosslinkers, such as polyethylene amides, formaldehyde, the like, and a combination thereof.

In some embodiments, the drilling fluid suspension may also include a breaker. The breaker is an additive of the drilling fluid suspension that provides a desired viscosity reduction in a specified period. The breaker may include, but is not limited to, oxidizing agents, such as sodium chlorites, sodium bromates, hypochlorites, perborates, persulfates, peroxides, enzymes, the like, and a combination thereof.

In some embodiments, the drilling fluid suspension may include a biocide. The biocide is an additive of the drilling fluid suspension that may kill microorganisms present in the drilling fluid suspension. The biocide may include, but is not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionanide, 2-bromo-2-nitro-1,3-propanedial, the like, and a combination thereof.

The drilling fluid suspension may also include a corrosion-inhibiting agent. The corrosion inhibiting agent is a chemical compound that decreases the corrosion rate of a material, more preferably, a metal or an alloy, that meets the drilling fluid suspension. In some embodiments, the corrosion inhibiting agent may include, but is not limited to, imidazolines, and amido amines. In some embodiments, the corrosion inhibiting agent may include, but is not limited to, oxides, sulfides, halides, nitrates, preferably halides, of metallic elements of group IIIa to VIa, such as $SbBr_3$, the like, and a combination thereof.

The drilling fluid suspension may also include an anti-scaling agent. The anti-scaling agent is an additive of the drilling fluid suspension that inhibits the formation and precipitation of crystallized mineral salts that form scale. The anti-scaling agent may include, but is not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), polymers of sulfonic acid on a polycarboxylic acid backbone, and the like. In some embodiments, the anti-scaling agent may further include phosphine, sodium hexametaphosphate, sodium tripolyphosphate, other inorganic polyphosphates, hydroxy ethylidene diphosphonic acid, butane-tricarboxylic acid, phosphonates, itaconic acid, 3-allyloxy-2-hydroxy-propionic acid, the like, and a combination thereof. In some embodiments, the drilling fluid suspension may include metal sulfide scale removal agents such as hydrochloric acid and the like.

The drilling fluid suspension may also include a chelating agent. The chelating agent may include, but is not limited to, dimercaprol (2,3-dimercapto-1-propanol), diethylenetriaminepentaacetic acid (DTPA), hydroxyethylenediaminetriacetic acid (HEDTA), ethylenediaminetetraacetic acid (EDTA), the like, and a combination thereof. Concentration of components of the drilling fluid suspension may be varied to impart desired characteristics of the drilling fluid suspension.

At step 54, the method 50 includes injecting the drilling fluid suspension in the subterranean geological formation. In some embodiments, the drilling fluid is injected into the subterranean geological formation through a wellbore. In some embodiments, driving a drill bit to form a wellbore in the subterranean geological formation may lead to the production of a formation fluid. In some embodiments, the formation fluid may be a sour gas and a sour crude oil. Sour gas is a natural gas, including an amount of hydrogen sulfide. In some embodiments, the formation fluid may include, but are not limited to, natural gas (i.e., majority methane), hydrocarbon or non-hydrocarbon gases (including condensable and non-condensable gases), light hydrocarbon liquids, heavy hydrocarbon liquids, rock, oil shale, bitumen, oil sands, tar, coal, and/or water, the like, and a combination thereof. Further, the non-condensable gases may include, but are not limited to, hydrogen, carbon monoxide, carbon dioxide, methane, and the like. In some other embodiments, the formation fluid may be in the form of a gaseous fluid, a liquid, or a double-phase fluid. In some embodiments, the formation fluid includes hydrogen sulfide. Microorganisms, such as sulfate-reducing bacteria, may generate hydrogen sulfide in gas and oil reservoirs. In some embodiments, some other method used or known in the art may lead to the formation of hydrogen sulfide in the wellbore. The subterranean geological formation includes one or more hydrocarbons similar to the hydrocarbons present in the formation fluid.

At step 56, the method 50 includes circulating the drilling fluid suspension in the subterranean geological formation preferably forming an oil-based mud (OBM). Once the drilling fluid suspension is injected into the reservoir, it mixes with the sub-surface fluid and circulates in the subterranean geological formation to form the OBM. The OBM may be a water-in-oil emulsion with an oleaginous liquid serving as a continuous phase and water serving as the dispersed phase, alternatively the OBM may be free of water and contain only the drilling fluid suspension and hydrocarbon based sub-surface derived fluids. Oil-based muds are often preferred over water-based muds for drilling subterranean oil and gas formations due to their high thermal stability and superior drilling performance. OBMs can withstand high temperatures over prolonged periods of time, whereas water-based muds tend to break down and exhibit poor flow and high fluid loss at similar conditions. Moreover, OBMs offer certain advantages, such as shale stability, a faster rate of penetration, the prevention of salt leaching, enhanced gauge hole formation, and a high tolerance for sour gases and solids. In some embodiments, the oil-based mud may have a density of 5 to 25 pounds per gallon (lbs/gal), preferably 7 to 22 lbs/gal, preferably 10 to 20 lbs/gal, and preferably 12 to 18 lbs/gal.

At step 58, the method 50 includes scavenging hydrogen sulfide from the subterranean geological formation. In some embodiments, the concentration of the cobalt-imidazolate material may be adjusted according to the hydrogen sulfide amount that may be encountered during the wellbore drilling. The hydrogen sulfide reacts with the cobalt-imidazolate material during scavenging and converts the hydrogen sulfide into a hydrosulfide. In some embodiments, the hydrogen sulfide is scavenged through uncoordinated open metal cobalt(II) and basic surface nitrogen functional groups in the cobalt-imidazolate material.

In some embodiments, the $H_2S$ scavenging performance of cobalt-imidazolate material in the drilling fluid suspension can be evaluated by flowing hydrogen sulfide gas into the drilling fluid suspension. For this purpose, the $H_2S$ gas is seeded in methane at a concentration of 50 to 150 parts per million volumes (ppmv), preferably 60 to 140 ppmv, preferably 70 to 130 ppmv, preferably 80 to 120 ppmv, preferably 90 to 110 ppmv, more preferably 95 to 105 ppmv, and yet more preferably about 100 ppmv. The $H_2S$ gas is flowed at a rate of 50 to 150 mL/min, preferably 80 to 120 mL/min, more preferably 90 to 110 mL/more, and yet more preferably about 100 mL/min. The drilling fluid suspension scavenges 1100 to 1200 milligrams of $H_2S$ per liter of the oil-based mud (mg/L), preferably 1120 to 1190 mg/L, preferably 1140 to 1180 mg/L, more preferably 1150 to 1170 mg/L, and yet more preferably about 1158 mg/L.

As used herein, the term "breakthrough time" refers to the time it took the outlet $H_2S$ concentration to reach 15 milligrams per cubic meter (mg $m^3$). In some embodiments, a breakthrough time for the $H_2S$ in the presence of the drilling fluid suspension is 2 to 3 times, preferably 2.1 to 2.8 times, preferably 2.2 to 2.6, more preferably 2.3 to 2.5 times, and yet more preferably 2.4 times greater compared to a breakthrough time for the $H_2S$ in the presence of the drilling fluid suspension without the cobalt-imidazolate material.

As used herein, the term "saturation time" refers to the time it took the outlet $H_2S$ concentration to reach 99 to 105 parts per million volume (ppmv), preferably 100 to 104 ppm. In some embodiments, a saturation time for the $H_2S$ in the presence of the drilling fluid suspension is 2 to 4 times, more preferably 2.1 to 3.0 times, and yet more preferably 2.8 times greater compared to a saturation time for the $H_2S$ in the presence of the drilling fluid suspension without the cobalt-imidazolate material.

As used herein, the term "breakthrough capacity" refers to the amount of $H_2S$ adsorbed by the material during the breakthrough period. In some embodiments, a breakthrough capacity for the $H_2S$ in the presence of the drilling fluid suspension is 2 to 3 times, preferably 2.1 to 2.8 times, preferably 2.2 to 2.6 times, more preferably 2.3 to 2.5 times, and yet more preferably 2.4 times greater compared to a breakthrough capacity for the $H_2S$ in the presence of the drilling fluid suspension without the cobalt-imidazolate material.

As used herein, the term "saturation capacity" refers to the amount of $H_2S$ adsorbed by the material during the saturation period. In some embodiments, a saturation capacity for the $H_2S$ in the presence of the drilling fluid suspension is 1 to 3 times, preferably 1.5 to 2.5 times, more preferably 2.0 to 2.2 times, and yet more preferably 2.1 times greater compared to a saturation capacity for the $H_2S$ in the presence of the drilling fluid suspension without the cobalt-imidazolate material.

As used herein, the term "apparent viscosity" refers to the Bingham model where the value is one-half of the dial reading from a viscometer at 600 rpm of shear stress [Onaizi, S. A., Gawish, M. A., Murtaza, M., Gomaa, I., Tariq, Z., Mahmoud, M., $H_2S$ scavenging capacity and rheological properties of water-based drilling muds, *ACS Omega*, 2020, 5, 30729-30739, which in incorporated herein by reference in its entirety]. In some embodiments, an apparent viscosity of the drilling fluid suspension is 20 to 50%, preferably 25 to 45%, and preferably 30 to 40% lower compared to an apparent viscosity of the drilling fluid suspension without the cobalt-imidazolate material.

As used herein, the term "plastic viscosity" refers to the difference between the dial readings from a viscometer recorded at 600 rpm and 300 rpm. In some embodiments, a plastic viscosity of the drilling fluid suspension is to 10 to 40%, preferably 15 to 35%, preferably 20 to 30%, and preferably 22 to 27% lower compared to the plastic viscosity of the drilling fluid suspension without the cobalt-imidazolate material.

EXAMPLES

The following examples demonstrate the method for removing hydrogen sulfide ($H_2S$) from a subterranean geological formation. The examples are provided solely for illustration and are not to be construed as limitations of the present disclosure, as many variations thereof are possible without departing from the spirit and scope of the present disclosure.

Example 1: Materials

Cobalt nitrate hexahydrate (purity≥98%, Sigma-Aldrich), ammonium hydroxide (28-30% $NH_3$, Sigma-Aldrich), and 2-methylimidazole (purity≥99%, Sigma-Aldrich) were utilized to synthesize the zeolitic imidazolate framework-67 (ZIF-67) nanoparticles (NPs). Waste cooking oil (WCO) (obtained locally) was utilized as the continuous phase of the oil-based muds. The additives used to prepare the oil-based drilling fluid are listed in Table 1. The chemicals and additives were used as received. No further purification was conducted.

Example 2: Synthesis of ZIF-67 Nanoparticles (NPs)

The ZIF-67 was prepared at room temperature according to previously reported methods [N. S. Kumar, M. S. Reddy, S. T. S. Kumar, V. R. Bheeram, S. B. Mukkamala, L. C. Rao, A Quantitative and Rapid Knoevenagel Condensation Catalyzed by Recyclable Zeolite Imidazole Frameworks. *ChemistrySelect* 4, 1188-1194 (2019); and K. S. Park, Z. Ni, A. P. Côté, J. Y. Choi, R. Huang, F. J. Uribe-Romo, H. K. Chae, M. O'Keeffe, O. M. Yaghi, Exceptional chemical and thermal stability of zeolitic imidazolate frameworks, *Proc Natl Acad Sci USA*. 103, 10186-10191 (2006), both of which are incorporated herein by references in their entireties]. Briefly, 0.06 mol of $Co(NO_3)_2 \cdot 6 H_2O$ dissolved in 80 milliliters (mL) of distilled water and 0.12 mol of 2-methylimidazole (2-MIM) completely dissolved in 130 nL of $NH_4OH$ solution (2.09 mol $NH_3$) were mixed together and continuously stirred for 30 minutes (min). The purple suspension was composed of a $Co^{2+}$:2-MIM:$NH_3$ molar ratio of 1:2:34. The resultant suspension was centrifuged at 10,000 revolutions per minute (rpm) and rinsed with distilled water until the supernatant approached a pH of 7. The obtained ZIF-67 NPs were dried overnight at 60 degrees Celsius (° C.) and sieved with a 450-micron mesh.

Example 3: ZIF-67 Characterization

To characterize and confirm the crystal structure and phases of the ZIF-67 NPs, the X-ray diffraction (XRD) patterns were measured using Cu kα radiation at 40 kilovolts (kV), 30 milliamperes (mA) and scanned over a range of 5-35°. Fourier Transform Infrared (FTIR) spectra were measured over a wavenumber range of 400 to 4000 $cm^{-1}$ with 32 scans using the KBr wafer technique to identify the surface functional groups. Structural properties, such as Brunauer-Emmett-Teller (BET)-specific surface area, pore volume, and pore size, were calculated from $N_2$ adsorption/desorption isotherms. The thermal stability of the ZIF-67 NPs was investigated under a gaseous nitrogen atmosphere in the temperature range of 30-800° C. using thermogravimetric analysis (TGA).

Example 4: Formulation of the WCO-Based Drilling Fluid Suspensions

The growing awareness of environmental preservation through proper waste management and the utilization of sustainable and environmentally friendly materials favors the replacement of diesel and mineral oils used in the formulation of oil-based muds with more environment-friendly and sustainable options. Thus, waste cooking oil was used to formulate oil-based drilling fluid suspensions per the composition shown in Table 1.

TABLE 1

Drilling fluid suspension composition

| Mixing order | Mixing Time (min) | Additives | Function | Quantities |
| --- | --- | --- | --- | --- |
| 1 | | Waste vegetable oil | Base fluid | 440 mL |
| 2 | 5 | ZIF-67 NPs | $H_2S$ scavenger | 0-1 wt. % |
| 3 | 15 | Span 80 | Primary emulsifier | 8 g |
| 4 | 15 | Gum Arabic | Gelling agent | 5 g |
| 5 | 15 | Copolymer* | Gelling agent | 2 g |
| 6 | 10 | Distilled water | Dispersed phase | 110 mL |
| 7 | 20 | SDBS** | Secondary emulsifier | 5 g |
| 8 | 20 | Starch | Fluid loss agent | 5 g |
| 9 | 20 | Bentonite | Viscofier | 27 g |
| 10 | 10 | Caustic soda | pH controller | 0.5 g |
| 11 | 5 | Potassium chloride | Shale stabilizer | 6 g |
| 12 | 5 | Sodium carbonate | pH treatment | 1.5 g |
| 13 | 20 | Barite | Weighting agent | 94 g |

*Poly(vinyl butyral-co-vinyl alcohol-co-vinyl acetate)
**sodium dodecylbenzenesulfonate The volumetric ratio of oil to water in the drilling fluid was 80:20. The waste vegetable oil (WO) was used as the continuous phase, and the distilled water was used as the dispersed phase. A laboratory mixer was used to mix all the additives continuously. For the base waste vegetable oil-based mud (WOBM) preparation, a primary emulsifying agent (span-80) was dispersed in the continuous oil phase, followed by the addition of gellants (gum Arabic and copolymer). The dispersed phase (water) was then added. This was followed by SDBS, starch, bentonite, caustic soda, potassium chloride, sodium carbonate, and barite. Different dosages (i.e., 0, 0.25, 0.5, 0.75, and 1.0 wt. %) of the synthesized ZIF-67 NPs were added to the drilling mud formulations after the addition of the primary emulsifying agent (Span-80) to enhance their dispersion in the oil phase of the prepared drilling mud formulations.

Example 5: $H_2S$ Scavenging Test

The breakthrough and saturation capacities of the drilling fluid formulations were determined in this test. The test was carried out in a bubble column. The test was conducted at room temperature and atmospheric pressure, 10 grams (g) of the drilling fluid sample was loaded into the bubble column for each experiment. The $H_2S$ gas (100 ppmv, balance methane) stored in a gas cylinder was continuously fed into the bubble column containing the drilling fluid sample of interest and the outlet gas concentration was continuously monitored by an $H_2S$ detector (0.1 ppm detection limit) connected to the set up. Using the flowmeter attached to the setup, the inlet $H_2S$ flow rate into the bubble column was maintained at 100 mL/min. For each drilling fluid sample, the outlet concentration of $H_2S$ was measured until saturation time was reached. The $H_2S$ breakthrough capacity and the saturation capacity were then calculated using equations 1 and 2, respectively.

$$\text{Breakthrough capacity}(mg/L) = (1.079 \times 10^{-2})\rho_{H_2S} \int_0^{t_b} (100 - C_{out})dt \quad (1)$$

$$\text{Saturation capacity}(mg/L) = (1.079 \times 10^{-2})\rho_{H_2S} \int_0^{t_s} (100 - C_{out})dt \quad (2)$$

Where $t_b$ is the breakthrough time (min), $t_s$ is the saturation time (min), $C_{out}$ is the outlet $H_2S$ concentrations (ppmv), and $\rho H_2S$ is density of $H_2S$ (1.391 mg/mL).

Example 6: Effect of the ZIF-67 NPs on Drilling Fluid Viscosity

The Bingham plastic model has been used to calculate plastic viscosity (PV) and apparent viscosity (AV) from 600 and 300 rpm dials using equations 3 and 4. The dial readings were measured using a rheometer (model M3600, Grace Instrument) at 120 degrees Fahrenheit (° F.) and 1 atmosphere (atm), according to standard API practice [H. Zhong, G. Shen, Z. Qiu, Y. Lin, L. Fan, X. Xing, J. Li, Minimizing the HTHP filtration loss of oil-based drilling fluid with swellable polymer microspheres. *J Pet Sci Eng.* 172, 411-424 (2019), which is incorporated herein by reference in its entirety]. A series of drilling fluid formulations were prepared with varying concentrations of ZIF-67 NPs in the range of 0-1 wt. % to evaluate their effect on the viscosity of the drilling fluid.

$$PV(cP) = \Phi_{600rpm} - \Phi_{300rpm} \quad (3)$$

$$AV(cP) = \frac{\Phi_{600rpm}}{2} \quad (4)$$

where $\Phi_{600rpm}$ and $\Phi_{300rpm}$ are dial readings at 600 rpm and 300 rpm, respectively.

Figure 2:
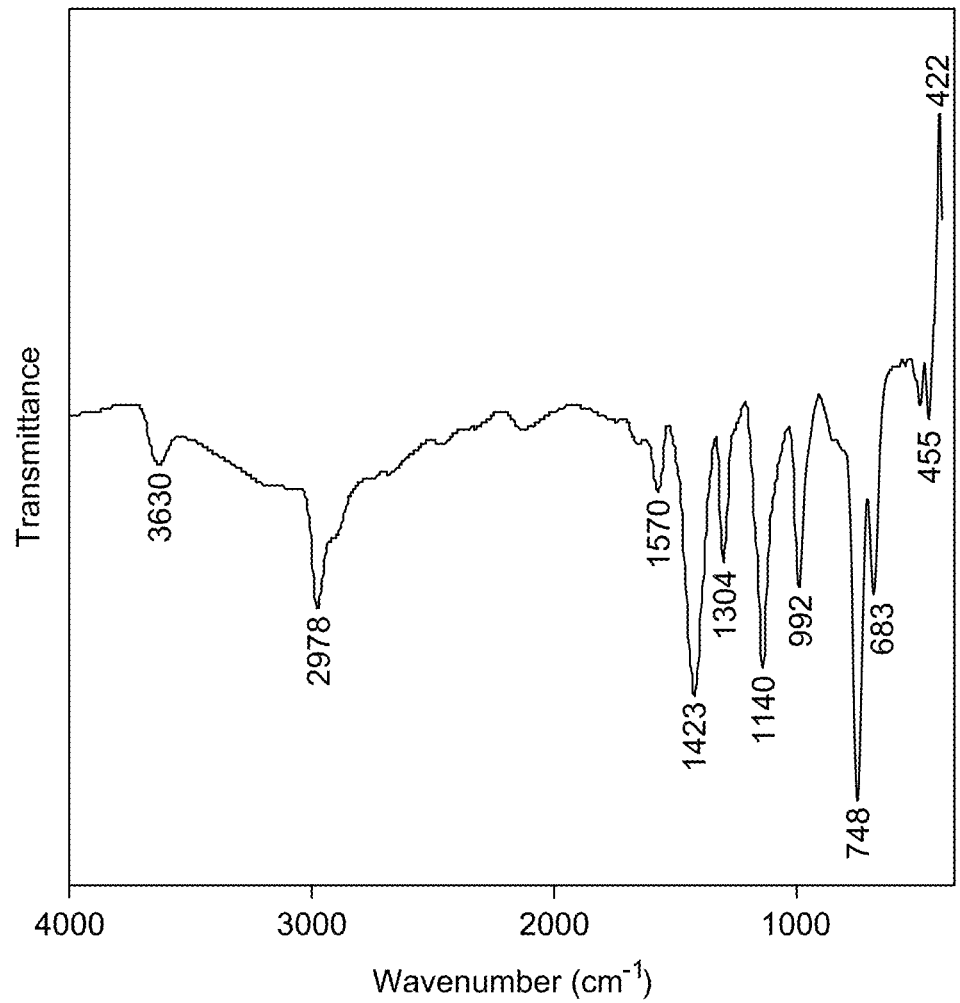
FIG. 2 depicts a Fourier transform infrared (FTIR) spectrum of the zeolitic imidazole framework (ZIF-67) nanoparticles (NPs), according to certain embodiments.

FIG. 2 depicts the FTIR spectra of the ZIF-67 NPs. The FTIR analysis was conducted to determine the surface functional groups on the synthesized ZIF-67 NPs. The broad and strong peaks between 1500-600 cm$^{-1}$ could be linked to the vibration and bending of the imidazole ring of the 2-methylimidazolate framework. The peak observed at 3630 cm$^{-1}$ is attributed to the O—H vibrational stretch of moisture present in the KBr deliquescence or the analyzed ZIF-67 sample. The peak at 2978 cm$^{-1}$ can be assigned to the aromatic and aliphatic C-L stretching vibration of the methyl group in the imidazole ring. Further, the peak at 1576 cm$^{-1}$ is attributed to C=N stretching vibrations in the imidazole ring [R. M. Abdelhameed, M. El-Shahat, Fabrication of ZIF-67@MIL-125-NH$_2$ nanocomposite with enhanced visible light photoreduction activity. *J Environ Chen Eng.* 7, 103194 (2019), which is incorporated herein by reference in its entirety]. The peaks at 1146 cm$^{-1}$ and 995 cm$^{-1}$ indicate the stretching and bending vibrations of the C—N in the imidazole ring, respectively. The peak located at 683 cm$^{-1}$ is attributed to the aromatic sp$^2$ C—H bending vibration. The band at 455-422 cm$^{-1}$ is assigned to the Co—N bond stretching vibration of the ZIF-67 nanocrystals.

Figure 3:
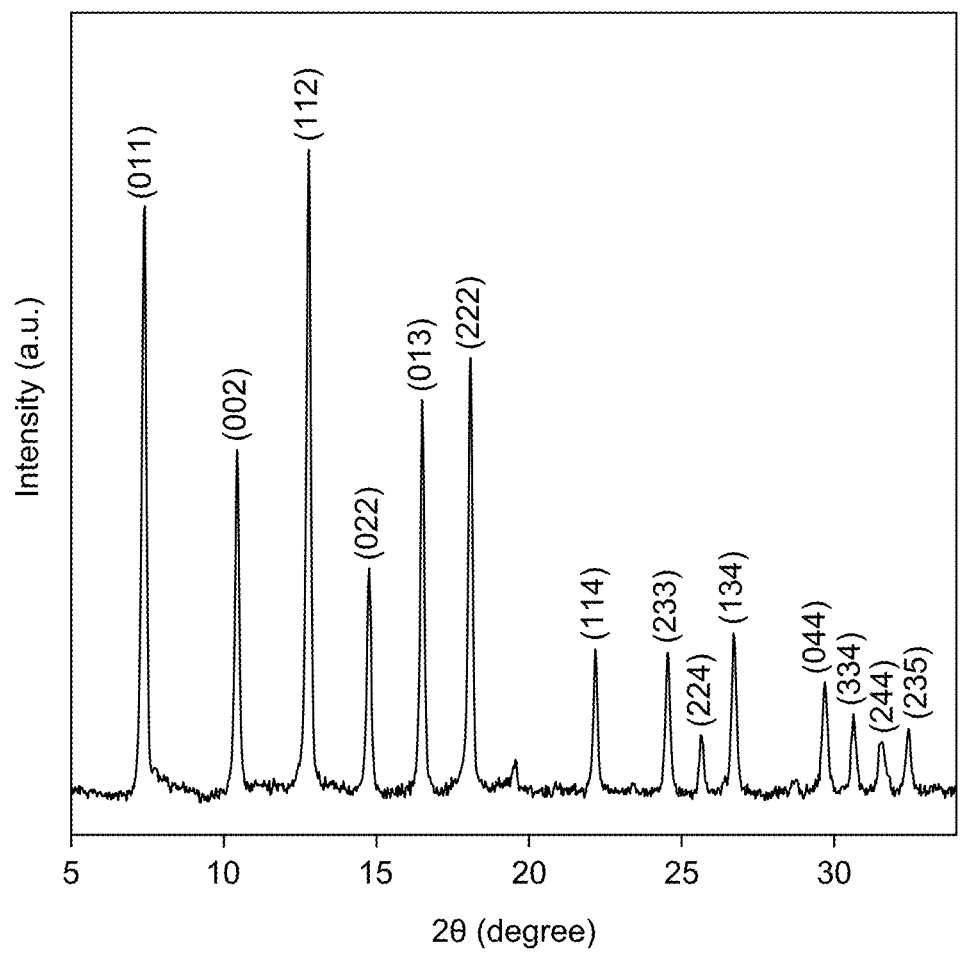
FIG. 3 depicts X-ray diffraction (XRD) patterns of the ZIF-67 NPs, according to certain embodiments.

FIG. 3 depicts the XRD pattern of the synthesized ZIF-67 NPs. The pattern demonstrated well-defined peaks at 2θ of 741, 10.44, 12.78, 14.76, 16.53, 18.09, 22.17, 24.54, 25.65, 26.70, 29.70, 30.63, 31.56, and 32.49° which correspond to the (011), (002), (112), (022), (013), (222), (114), (233), (224), (134), (044), (334), (244), and (235) crystal planes, respectively. The pattern exhibited sharp diffraction peaks, which shows the high purity and crystallinity of the synthesized ZIF-67 NPs.

Figure 4:
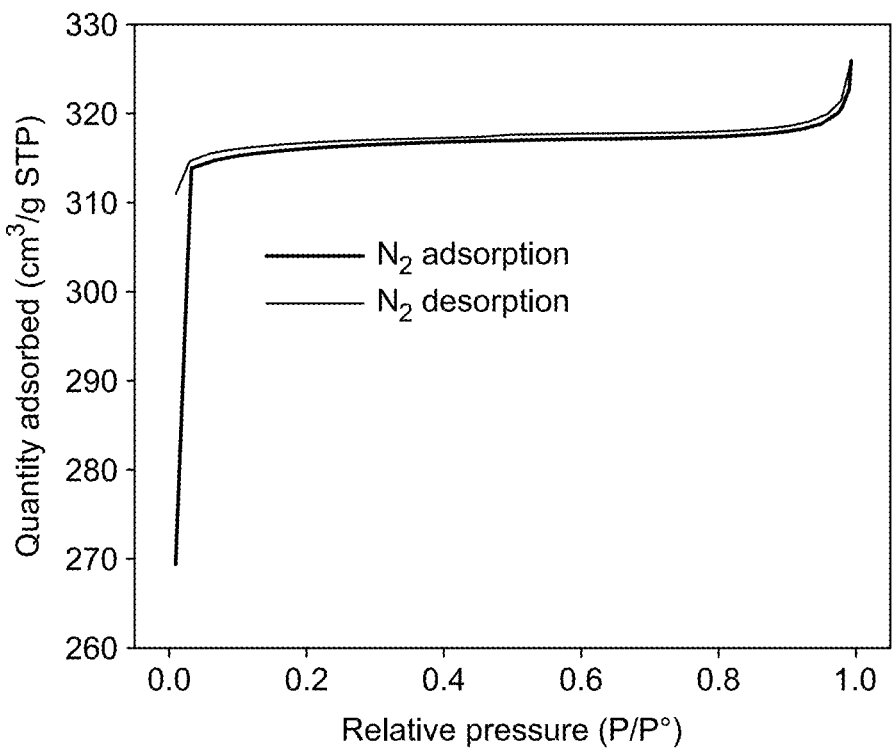
FIG. 4 depicts nitrogen ($N_2$) adsorption/desorption isotherms on/from the ZIF-67 NPs, according to certain embodiments.

FIG. 4 illustrates the $N_2$ adsorption-desorption isotherms of the synthesized ZIF-67 NPs. The isotherm shows a characteristic Type I sorption behavior with a remarkably high nitrogen absorption capacity at low relative pressure, which indicates the microporosity of the synthesized ZIF-67 NPs. The BET surface area was calculated to be 1158 meters square per gram (m$^2$/g). The average pore size, specific pore volume, and average particle size based on the adsorption/desorption isotherm were estimated to be 1.71 nanometers (nm), 0.495 cubic centimeters per gram (cmi/g), and 20.7 nm, respectively.

Figure 5:
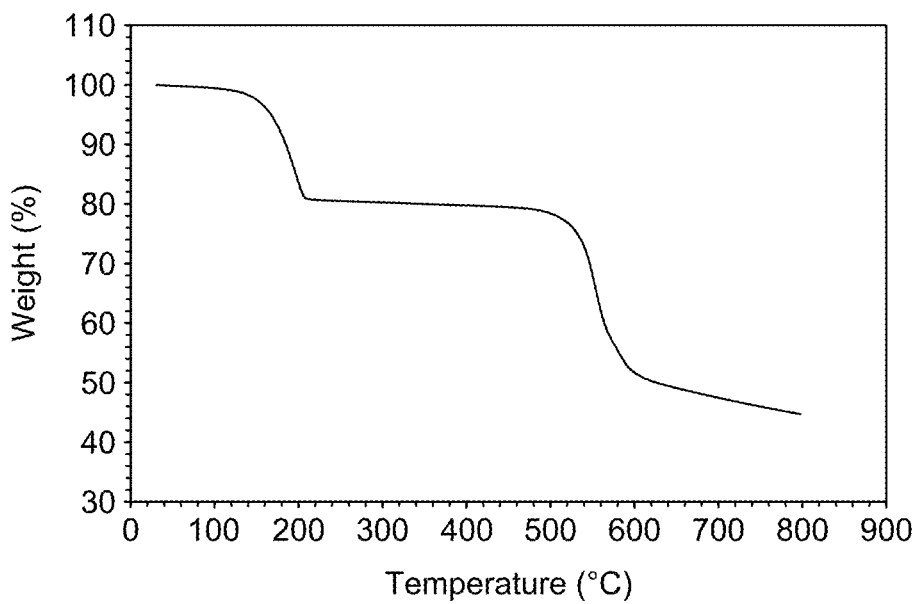
FIG. 5 depicts thermal stability of the ZIF-67 NPs measured using thermogravimetric analysis (TGA) under $N_2$ gas environment, according to certain embodiments.

Moreover, thermogravimetric analysis (TGA) was conducted to determine the thermal stability of the synthesized ZIF-67 NPs under a nitrogen atmosphere within the temperature range of 30 to 800° C., The TGA profile of the ZIF-67 NPs is depicted in FIG. 5. The profile shows two stages of mass loss from the ZIF-67 NPs. The first mass loss of about 20% is due to the removal of guest molecules from the surface and the pores of ZIF-67 NPs, as well as any adsorbed moisture or gas (e.g., CO$_2$) from the atmosphere. The second mass loss of about 34% was observed from about 500° C. to the highest temperature of 800° C. investigated herein. Between 200° C. and 500° C., there is no observable mass loss. Accordingly, the TGA results reveal the excellent thermal stability of ZIF-67 NPs up to 500° C. This temperature is much lower than the typical maximum oil reservoir temperature, even at very high depths, so ZIF-67 NPs would not undergo any thermal changes when utilized as additives in oil-based or water-based drilling fluid suspensions, as well as other oilfield applications.

Figure 6:
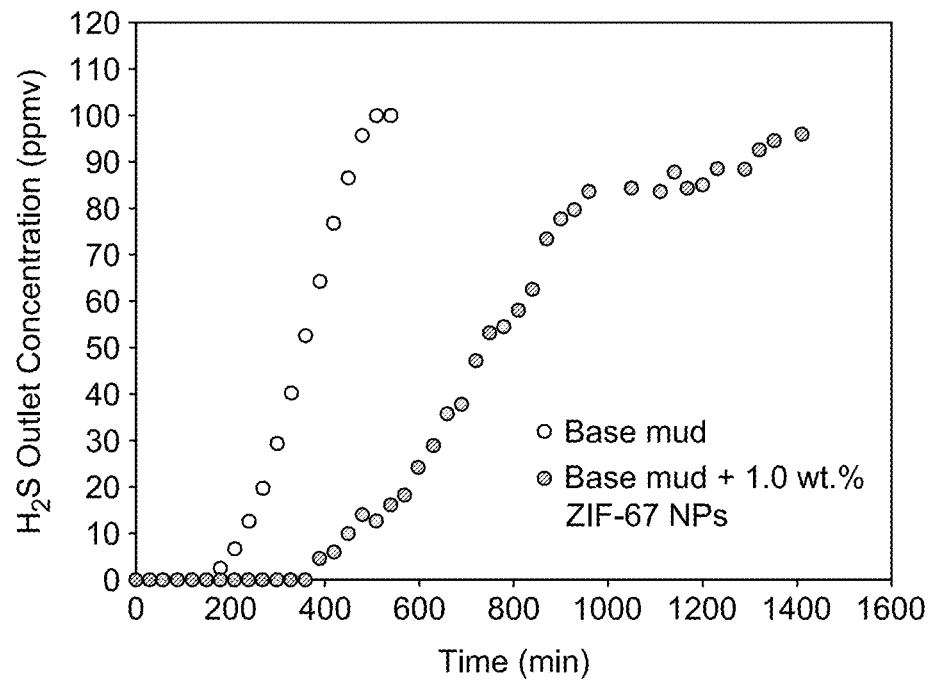
FIG. 6 depicts $H_2S$ scavenging breakthrough curves of a drilling fluid suspension, including a base mud alone and the base mud in combination with the ZIF-67 NPs, according to certain embodiments.
Figure 7:
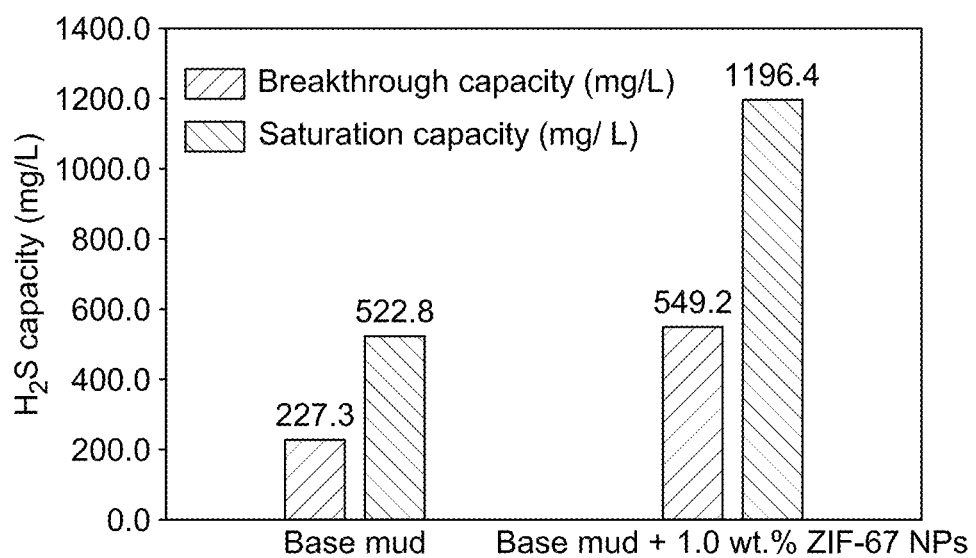
FIG. 7 shows $H_2S$ scavenging capacities of the drilling fluid suspension, including the base mud alone and the base mud in combination with the ZIF-67 NPs, at a breakthrough capacity and a saturation capacity, according to certain embodiments.

The scavenging performance of ZIF-67 NPs was determined by continuously passing $H_2S$ gas through the WOBM formulations until saturation, when the concentration of $H_2S$ in the outlet gas stream is equal to that in the inlet stream (i.e., 104 ppmv). The base WOBM without any scavenger and the 1 wt. % ZIF-67-based WOBM was used for the scavenging tests. FIG. 6 depicts the changes in the $H_2S$ concentration of the outlet gas stream measured as a function of time. The base WOBM exhibited a relatively lower scavenging capacity than the mud with ZIF-67-based WOBM. The base mud without the scavenger had breakthrough and saturation times of 151.5 min and 498.5 min, which correspond to scavenging capacities of 227.3 and 552.8 milligrams per liter (mg/L) of mud, respectively (FIG. 7). As seen in FIG. 6, the incorporation of 1 wt. % ZIF-67 into the base mud improved the $H_2S$ scavenging performance. Interestingly, the time and capacities at breakthrough and saturation of the ZIF-67-based WOBM are almost 140 and 130% compared to the base mud, respectively. Adding ZIF-67 NPs to the base mud achieved breakthrough and saturation times of 366 min and 1401 min, respectively, correspond to a capacity of 549.2 and 1196.4 mg/L of mud (FIG. 7).

Figure 8:
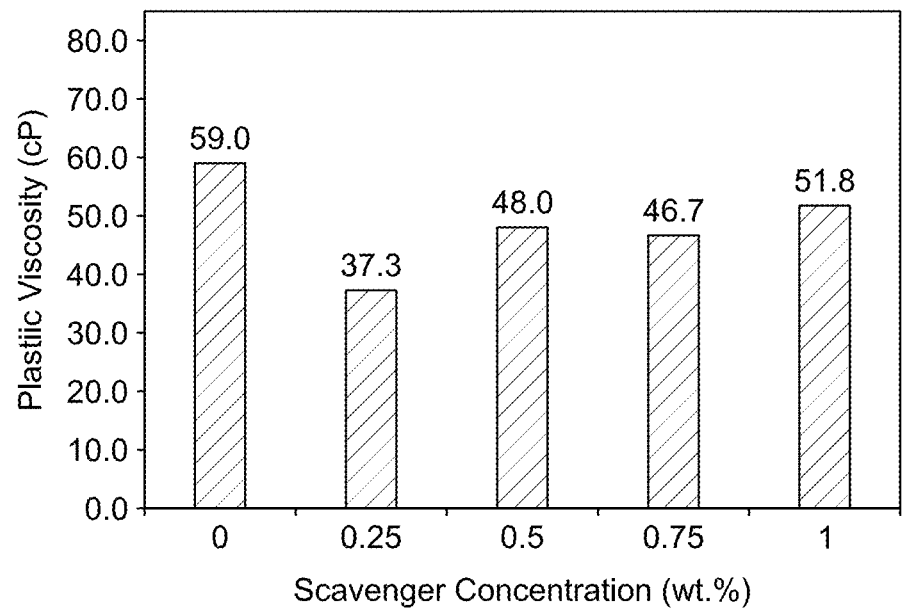
FIG. 8 shows influence of the ZIF-67 NPs concentration on plastic viscosity (PV) of the drilling fluid suspension formulated with waste cooking oil-based mud, according to certain embodiments.

FIG. 8 depicts the effect of ZIF-67 NPs-content on the plastic viscosity (PV) of the drilling fluid samples. PV measures the resistance to the flow of drilling muds induced by mechanical friction between solid particles in the mud formulation. A higher value of the PV indicates a proportionally higher resistance to flow and a lower PV value indicates less resistance to the circulation of the drilling mud. For the continuous circulation of drilling mud, moderate PV values are sought to minimize the energy required for pumping and to increase the rate of penetration (ROP) of the drilling fluid. As shown in FIG. 8, the base fluid had a PV of 59.0 centipoise (cP). Upon addition of 0.25 wt. % ZIF-67 NPs to the base fluid, the PV reduced to 37.3 cP. The greatest decrease in PV is seen in the addition of 0.25 wt. % ZIF-67 NPs. The initial drop in PV was about 36.6% compared to the base fluid at a ZIF-67 content of 0.25 wt. %, which could be attributed to the initial disruption of the gel formation within the drilling mud system. This indicates that adding the ZIF-67 NPs at such a concentration (i.e., 0.25 wt. %) reduces the resistance of the drilling fluid due to deformation. Further increase of the ZIF-67 NPs content increased the PV, primarily due to the increase in the solid content of the mud and the corresponding increase in particulate friction.

Figure 9:
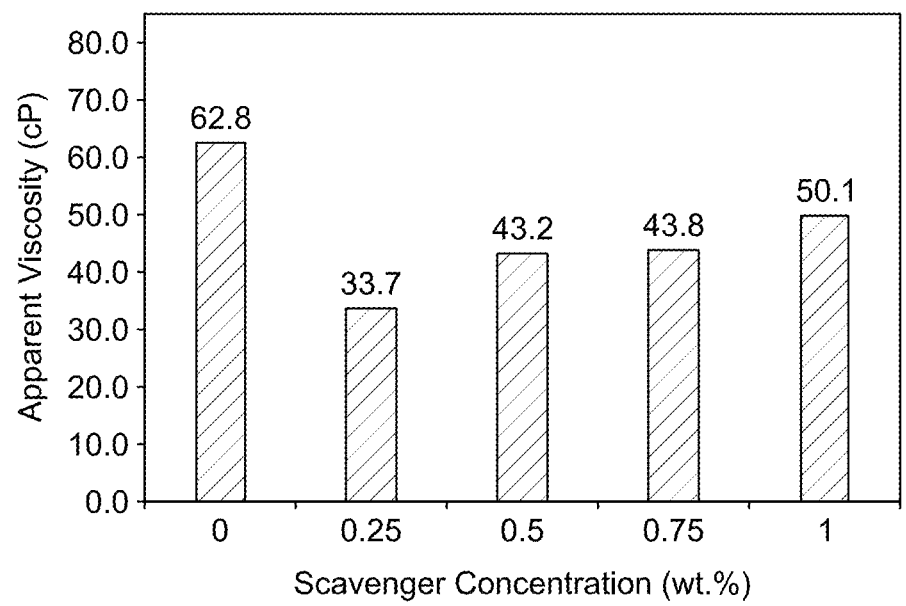
FIG. 9 shows influence of the ZIF-67 NPs concentration on apparent viscosity (AV) of the drilling fluid suspension formulated with waste cooking oil-based mud, according to certain embodiments.

FIG. 9 depicts the influence of ZIF-67 NPs on the AV. As seen in FIG. 9, the AV measured shows a trend like that of the PV. The base WOBM had the highest AV value of 62.8 cP, which decreased to 33.7 cP after adding 0.25 wt. % ZIF-67 NPs. This reduction of the AV observed is due to the decrease in inter-particle friction, which further resulted in the decrease in WOBM resistance to flow (i.e., viscosity). After the initial reduction in AV at 0.25 wt. % ZIF-67 NPs in WOBM, the AV is observed to increase from 33.7 cP up to 50.1 cP at 1 wt. % ZIF-67 NPs content. The increase in AV upon further addition of ZIF-67 NPs occurs because of the increase in the interactions between the WOBM additives, increasing the resistance to flow. The results indicate that the viscosity of the drilling fluid was not adversely affected by the addition of ZIF-67 NPs.

The inclusion of ZIF-67 NPs improved the scavenging ability of the base mud due to the surface properties of the NPs. The availability of unsaturated coordinative metal sites ($CO^{2+}$) and surface nitrogen functional groups, together with the high specific surface area, provides ZIF-67 NPs with a number of scavenging sites for improved sour gas scavenging performance. Incorporating ZIF-67 NPs does not adversely affect the flow characteristics and viscosity of the drilling fluid to ensure that the mud remains functional for circulation and drilling operations.

Aspects of the present disclosure are directed towards removing $H_2S$ from a subterranean geological formation with ZIFs. The present disclosure provides ZIF-67 NPs in a waste cooking oil to enhance the scavenging capability of a drilling fluid suspension formulated with the waste cooking oil (WCO). Additionally, the impact of the ZIF-67 NPs on the apparent and plastic viscosities of the was investigated. At the breakthrough and saturation times, the addition of ZIF-67 NPs increased the $H_2S$ scavenging capability of the drilling fluid suspension by 140 and 130%, respectively. The ZIF-67 NPs exhibited the ability to remove $H_2S$ from the drilling fluid suspension. In addition, the inclusion of ZIF-67 NPs did not greatly alter the apparent and plastic viscosities of the WCO-based drilling fluid suspension. The apparent and plastic viscosities showed comparable trends to one another with the addition of ZIF-67 NPs. The cobalt-imidazolate material may be utilized for $H_2S$ removal from fluid systems other than organic systems, such as the removal of $H_2S$ from water injection systems, $H_2S$ from produced water from an oilfield, and $H_2S$ present in mixed production streams. A method of mitigating unwanted effects of $H_2S$ on organic liquid that is exposed to $H_2S$ where the organic liquid is treated with a cobalt-imidazolate scavenger is disclosed herein. The product of the cobalt-imidazolate scavenger does not adversely affect the organic liquid rheology and fluid loss properties, whereby the corrosion of metallic structures is simultaneously prevented.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of removing hydrogen sulfide from a subterranean geological formation, comprising:
    mixing a cobalt-imidazolate material with an organic liquid to form a drilling fluid suspension,
    wherein the cobalt-imidazolate material is present in an amount of 0.1 to 2.5 percent by weight of the drilling fluid suspension,
    wherein the cobalt-imidazolate material is a ZIF-67,
    wherein the organic liquid comprises one or more unsaturated oils,
    wherein the drilling fluid suspension has a pH of 10 or more,
    injecting the drilling fluid suspension in the subterranean geological formation,
    circulating the drilling fluid suspension in the subterranean geological formation and forming an oil-based mud; and
    scavenging hydrogen sulfide from the subterranean geological formation,
    wherein the hydrogen sulfide reacts with the cobalt-imidazolate material during the scavenging.

2. The method of claim 1, wherein the cobalt-imidazolate material has a Brunauer-Emnmett-Teller surface area of 1100 to 1200 meters square per gram ($m^2/g$).

3. The method of claim 1, wherein the cobalt-imidazolate material is porous and has a specific pore volume of 0.400 to 0.600 cubic meter per gram ($cm^3/g$).

4. The method of claim 1, wherein the cobalt-imidazolate material is porous and has an average pore size of 1 to 3 nanometers (nm).

5. The method of claim 1, wherein the cobalt-imidazolate material is in the form of nanoparticles and has an average particle size of 15 to 25 nm.

6. The method of claim 1, wherein the drilling fluid suspension comprises the one or more unsaturated oils, a polysorbate, a gum Arabic, a copolymer, water, a sodium sulfonate, a starch, a bentonite, a hydroxide, a chloride salt, a carbonate salt, and a barite.

7. The method of claim 6, comprising an unsaturated oil and wherein a volumetric ratio of the unsaturated oil to the water is from 70:30 to 90:10 in the organic liquid.

8. The method of claim 6, wherein the polysorbate is polysorbate 80.

9. The method of claim 1, wherein the unsaturated oil comprises at least one triglyceride, a glycerol, at least one triacylglycerol, at least one diacylglycerol, at least one monoacylglycerol, a linoleic acid, a stearic acid, an oleic acid, and a palmitic acid.

10. The method of claim 1, wherein the drilling fluid suspension consists of the cobalt-imidazolate material and the unsaturated oil.

11. The method of claim 1, wherein a breakthrough time for the hydrogen sulfide in the presence of the drilling fluid suspension is 2 to 3 times greater compared to a breakthrough time for the hydrogen sulfide in the presence of the drilling fluid suspension without the cobalt-imidazolate material.

12. The method of claim 1, wherein a saturation time for the hydrogen sulfide in the presence of the drilling fluid suspension is 2 to 4 times greater compared to a saturation time for the hydrogen sulfide in the presence of the drilling fluid suspension without the cobalt-imidazolate material.

13. The method of claim 1, wherein a breakthrough capacity for the hydrogen sulfide in the presence of the drilling fluid suspension is 2 to 3 times greater compared to a breakthrough capacity for the hydrogen sulfide in the presence of the drilling fluid suspension without the cobalt-imidazolate material.

14. The method of claim 1, wherein a saturation capacity for the hydrogen sulfide in the presence of the drilling fluid suspension is 1 to 3 times greater compared to a saturation capacity for the hydrogen sulfide in the presence of the drilling fluid suspension without the cobalt-imidazolate material.

15. The method of claim 1, wherein a plastic viscosity of the drilling fluid suspension is to 10 to 40% lower compared to a plastic viscosity of the drilling fluid suspension without the cobalt-imidazolate material.

16. The method of claim 1, wherein an apparent viscosity of the drilling fluid suspension is to 20 to 50% lower compared to an apparent viscosity of the drilling fluid suspension without the cobalt-imidazolate material.

17. The method of claim 1, wherein the hydrogen sulfide is scavenged through uncoordinated open metal cobalt (II) and surface nitrogen functional groups in the cobalt-imidazolate material.

18. The method of claim 1, further comprising flowing hydrogen sulfide gas into the drilling fluid suspension.

19. The method of claim 18, wherein the hydrogen sulfide is at a concentration of 50 to 150 parts per million volumes with a balance to methane in the subterranean geological formation.

20. The method of claim 18, wherein the flowing of hydrogen sulfide gas is done at a rate of 50 to 150 milliliters per minute (mL/min).

\* \* \* \* \*